United States Patent [19]
Delgado et al.

[11] Patent Number: 4,776,052
[45] Date of Patent: Oct. 11, 1988

[54] VERTICALLY STORED DOCKBOARD

[75] Inventors: Joe M. Delgado, Waukesha; William B. Weishar, Brookfield, both of Wis.

[73] Assignee: Kelley Company, Inc., Milwaukee, Wis.

[21] Appl. No.: 64,987

[22] Filed: Jun. 22, 1987

[51] Int. Cl.⁴ .............................................. E01D 1/00
[52] U.S. Cl. ...................................... 14/71.3; 14/71.7
[58] Field of Search ....................... 14/71.1, 71.3, 71.7

[56] References Cited

U.S. PATENT DOCUMENTS

| | | | |
|---|---|---|---|
| 3,327,650 | 6/1967 | Bridges et al. | 14/71.1 X |
| 3,685,076 | 8/1972 | Loblick | 14/71.7 |
| 3,685,077 | 8/1972 | Wiener | 14/71.3 |
| 3,694,839 | 10/1972 | Loblick | 14/71.7 |
| 4,257,137 | 3/1981 | Hipp et al. | 14/71.3 |
| 4,343,058 | 8/1982 | Loblick | 14/71.7 |
| 4,398,315 | 8/1983 | Driear | 14/71.3 |
| 4,525,887 | 7/1985 | Erlandsson et al. | 14/71.3 |
| 4,665,579 | 5/1987 | Bennett et al. | 14/71.1 |
| 4,689,846 | 9/1987 | Sherrod | 14/71.3 |

Primary Examiner—Jerome W. Massie, IV
Assistant Examiner—Matthew Smith
Attorney, Agent, or Firm—Andrus, Sceales, Starke & Sawall

[57] ABSTRACT

A vertically stored dockboard. The dockboard includes a frame or supporting structure which is mounted on a loading dock and a rap or deck plate is hinged at its rear edge to the frame and is movable between a generally vertical storage position and a horizontal operating position where the ramp bridges the gap between the loading dock and a truck parked in front of the dock. The ramp is moved upwardly to the vertical storage position by a hydraulic cylinder mechanism and is locked in the storage position by a toggle assembly. As the ramp is moved upwardly to the vertical storage position, the toggle assembly will be automatically moved to an over-center position to lock the ramp in the storage position. The toggle assembly can be released by a manually operated toggle release arm to enable the ramp to fall by gravity to the horizontal storage position.

9 Claims, 3 Drawing Sheets

VERTICALLY STORED DOCKBOARD

BACKGROUND OF THE INVENTION

Dockboards are used in conjunction with loading docks to bridge the gap between the dock and a truck backed in front of the dock to enable material handling equipment, such as a fork lift truck, to move freely between the dock and the bed of the truck. One common form of dockboard is mounted in a pit in the dock and includes a ramp or deck plate which is hinged at its rear edge to the dock and is normally stored in a horizontal or cross traffic position where the ramp is flush with the loading dock. A lip is hinged to the front edge of the ramp and is movable between a downwardly hanging pendant position and an extended position where it forms an extension to the ramp.

To operate a dockboard of this type, the ramp is initially pivoted upwardly to an inclined position, the lip is then extended and the ramp is then lowered until it engages the bed of the truck.

With a horizontally stored dockboard, the overhead door, which encloses the doorway in the dock, is adapted to engage the upper surface of the ramp when the door is in the closed position. With this arrangement, the area between the undersurface of the ramp and the bottom of the pit is not completely weather sealed.

A second type of dockboard is one that is stored vertically within the building so that the overhead door, when in the closed position, will seal against the bottom surface of the pit, to provide a more effective weather seal. With a vertically stored dockboard, the ramp is hinged at its rear edge to a supporting frame and is movable between a generally horizontal operating position and a vertical storage position.

In the conventional vertically stored dockboard, the ramp is moved upwardly to the vertical storage position by a hydraulic cylinder unit or a mechanical counterbalancing system and is locked in the vertical storage position by a mechanical locking mechanism, which can be manually released to enable the ramp to descend by gravity to the horizontal operating position.

SUMMARY OF THE INVENTION

The invention is directed to a vertically stored dockboard and more particularly to an improved locking mechanism for locking the ramp in the vertical storage position. In accordance with the invention, the rear edge of the ramp is hinged to a frame or supporting structure mounted in a pit in the loading dock. The ramp is moved between the horizontal operating position and the vertical storage position by a hydraulic cylinder unit and is locked in the vertical storage position by a toggle assembly, including a pair of toggle links. One of the links is pivoted to the undersurface of the ramp, while the second link is pivoted to the frame and opposite ends of the links are connected together at a third pivot.

As the ramp is moved toward the vertical storage position, the toggle assembly is automatically moved to an over-center position which will lock the ramp in the vertical position and prevent downward movement of the ramp.

When it is desired to move the ramp to the horizontal operating position, the toggle assembly is moved to an under-center position by a manually operated toggle release arm. By releasing the toggle assembly, the ramp can then descend by gravity to the horizontal position, where the lip hinged to the forward edge of the ramp, will engage the bed of the truck.

The toggle assembly provides a positive lock to maintain the ramp in the vertical storage position, and can be readily released by an operator standing on the dock. In addition, the toggle assembly can incorporate a cushioning mechanism which acts to dampen or cushion the impact of the ramp as it is moved to the vertical storage position as well as cushioning any "bounce back" of the ramp.

Other objects and advantages will appear in the course of the following description.

DESCRIPTION OF THE DRAWINGS

The drawings illustrate the best mode presently contemplated of carrying out the invention.

In the drawings:

FIG. 4 section taken along line 4—4 of FIG. 2; and

FIG. 5 is a section taken along line 5—5 of FIG. 1 and showing the hydraulic cylinder unit.

DESCRIPTION OF THE ILLUSTRATED EMBODIMENT

The drawings illustrate a vertically stored dockboard 1 that is mounted on a loading dock 2 in a building 3. Dock 2 is formed with a pit or depression which is located beneath a doorway 5 in the wall of building 3. The doorway 5 can be closed by an overhead door, not shown.

Figure 1:
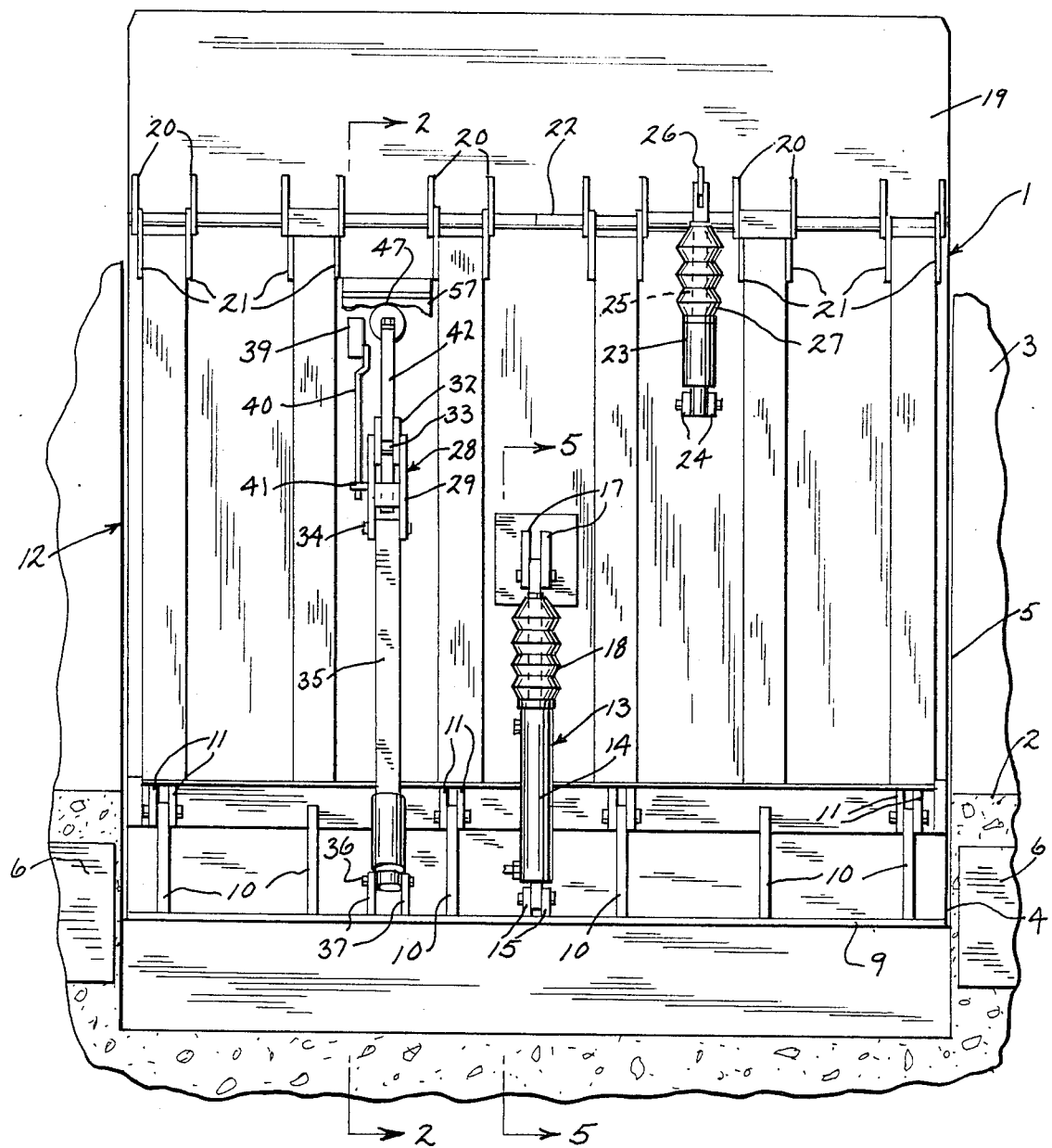
FIG. 1 is a front elevation of the vertically stored dockboard of the invention.

As shown in FIG. 1, bumpers 6 are located on the front wall of dock 2 on either side of pit 4 and the bumpers are adapted to be engaged by the rear end of a truck as a truck backs toward the loading dock.

Dockboard 1 includes a frame or supporting structure 7, which is mounted in pit 4. More particularly, frame 7 includes a channel member 8 which is secured by suitable anchors to the rear wall of pit 4 and a plate 9 extends forwardly from channel 8 and is anchored to the bottom of pit 4.

Figure 2:
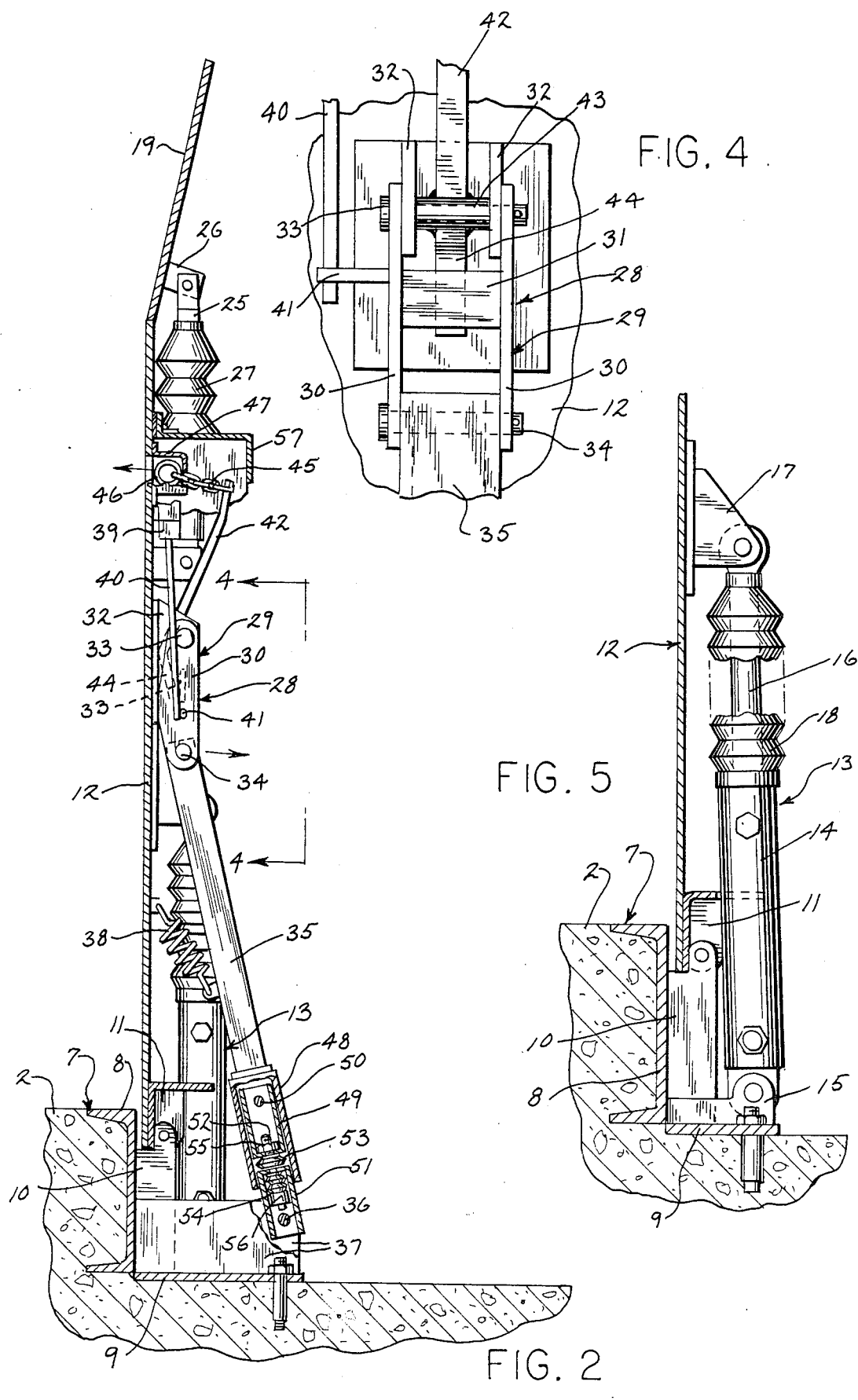
FIG. 2 is a vertical section taken along line 2—2 of FIG. 1 and showing the ramp in the vertical storage position.

Extending outwardly from channel 8 are several lugs 10, and lugs 11 mounted at the rear of a ramp or deck plate 12 are pivotally connected to lugs 10 in a manner such that the ramp 12 can be pivoted between a generally horizontal operating position and a vertical storage position, as shown in FIGS. 1 and 2.

Ramp 12 is pivoted upwardly to the vertical storage position by a hydraulic cylinder unit 13, which includes a hydraulic cylinder 14, the lower end of which is pivotally connected to lugs 15 that extend pivotally upward from plate 9. A piston slidable in cylinder 14 carries a piston rod 16, the upper end of which is pivotally connected to lugs 17 that are attached to the underside of ramp 12. An expandable bellows 18 can be mounted around piston rod 16 to protect the rod and prevent contamination from foreign materials.

By introducing hydraulic fluid into the lower end of cylinder 14, piston rod 16 will be extended to thereby pivot ramp 12 upwardly to the vertical storage position.

A lip 19 is hinged to the forward end of ramp 12 and can be moved between a pendant position and an extended position, where it forms an extension to the ramp. Lip 19 and ramp 12 are provided with lugs 20 and 21, respectively, which are connected by a hinge pin 22 to permit pivoting movement of the lip between the pendant and extended positions.

Lip 19 is independently moved to the extended position by a hydraulic cylinder 23. One end of cylinder 23 is pivotally connected to lugs 24 attached to the undersurface of the ramp, while the piston rod 25 of cylinder 23 is pivotally connected to lug 26 mounted on the undersurface of lip 19. By extending piston rod 25, the lip 19 can be moved to the extended position.

To protect the piston rod from foreign materials an expandable bellows 27 can be positioned around the piston rod 25, as shown in FIG. 1.

In accordance with the invention, ramp 12 is locked in the vertical storage position by a toggle assembly indicated generally by 28. Toggle assembly 28 includes a toggle link 29 composed of a pair of spaced parallel plates 30 connected by a cross plate 31. One end of toggle link 29 is pivotally connected to lugs 32 which extend downwardly from the undersurface of ramp 12 by pivot 33, while the opposite end of link 29 is connected by pivot 34 to an end of a second toggle link 35. The opposite end of toggle link 35 is connected by pivot 36 to a pair of brackets 37 which are welded to channel 8 and plate 9.

Figure 3:
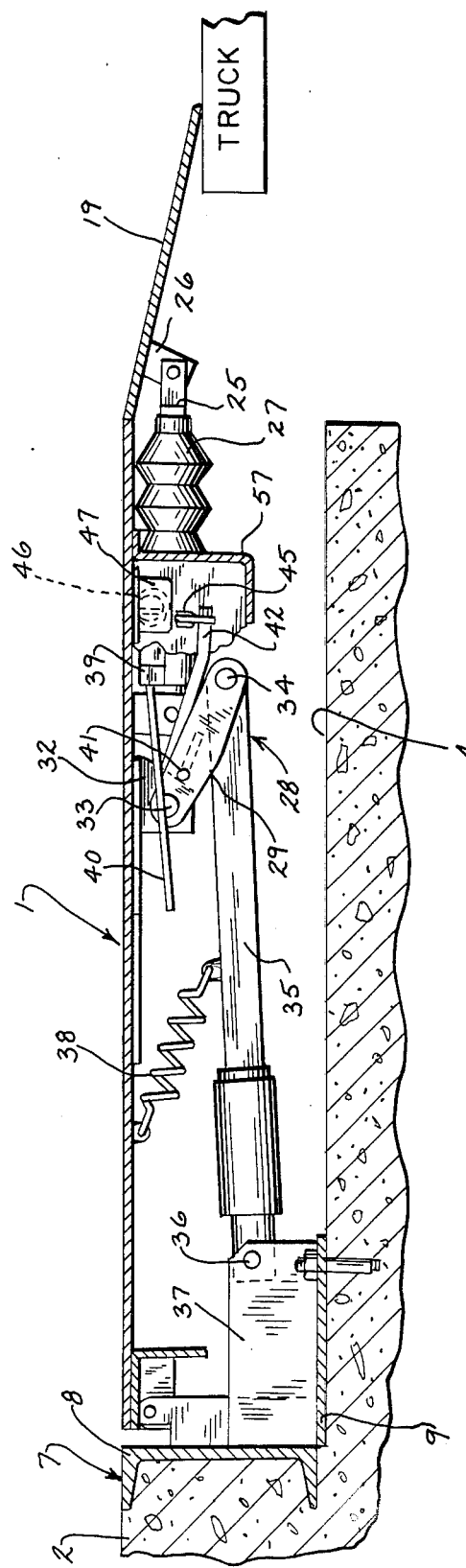
FIG. 3 is a view similar to FIG. 2 showing the ramp in the generally horizontal operating position.

When ramp 12 is in the generally horizontal operating position, as shown in FIG. 3, links 29 and 35 are in an under-center relation in which the links are at an acute angle with respect to each other. As the ramp 12 is pivoted upwardly through operation of hydraulic cylinder unit 13, links 29 and 35 will move to an in-line condition, in which pivot 34 is disposed on a line extending between the axes of pivots 33 and 36, to an over-center position where pivot 34 lies in a direction toward the undersurface of the ramp from the line passing between the axes of pivots 33 and 36, as shown in FIG. 2. With the toggle assembly in the overcenter position, ramp 12 will be locked in the vertical storage position so that it cannot freely descend.

Toggle assembly 28 is based to the overcenter position by an extension spring 38 which is connected between the undersurface of ramp 12 and link 35 in conjunction with gravity acting on link 35.

The invention also includes a sensing mechanism which will automatically discontinue extension of the hydraulic cylinder unit 13 when the toggle assembly 28 is in the over-center position. In this regard, a limit switch 39 is mounted on the undersurface of the ramp and carries an arm or wand 40, which is adapted to be engaged by a pin 41 on link 29 as the toggle assembly 28 moves to the over-center position. Actuation of the switch 39 will act to stop operation of the pump of the hydraulic system that extends cylinder unit 13.

Toggle assembly 28 can be released manually in order to permit ramp 12 to descend to the horizontal position. To release the toggle assembly, a release arm 42 is secured to a sleeve 43, which is mounted for rotation on pivot shaft 33. Arm 42 is provided with a bent end 44, which is adapted to engage cross plate 31 of toggle link 29. The opposite end of arm 42 is connected to a chain 45 which carries a pull ring 46 located within a well 47 formed in ramp 12. An operator standing on the dock 2 and pulling outwardly on pull ring 46 will pivot arm 42 about the axis of pivot 33 to thereby move toggle link 29 outwardly away from ramp 12 to break the toggle and move the links to an under-center condition. With the toggle assembly 28 in an under-center condition, the ramp 12 will then descend by gravity to the horizontal position.

The speed of descent of the ramp is controlled in a conventional manner through the hydraulic system in which the hydraulic fluid, being discharged from cylinder 14 flows through a restrictive orifice.

The invention also includes a mechanism for cushioning or dampening the upward swinging movement of the ramp when it reaches the vertical position. In this regard, the lower end of link 35 includes a sleeve 48, which is located concentrically around a cup-shaped member 49 and is connected to member 49 by a cross pin 50. A similar cup-shaped member 51 is connected to brackets 37 by the pivot 36, and a rod 52 extends through openings in the closed ends of members 49 and 51. Disc springs 53 are located between the ends of members 49 and 51, and a second group of disc springs 54 are mounted on rod 52 and located within member 51. Nuts 55 and 56 are threaded on opposite ends of rod 52. Springs 54 act to cushion the upward swing of the ramp to the vertical position, while springs 53 act to dampen any "bounce back" which may occur.

The toggle assembly 28 can be enclosed by a suitable housing or casing 57 which is mounted to the undersurface of ramp 12.

The invention provides a simple and effective toggle locking mechanism for retaining the ramp in the vertical storage position, and the toggle assembly incorporates a cushioning mechanism which dampens the upward swinging movement of the ramp as it reaches the vertical position, as well as cushioning any "bounce back" in the opposite direction.

While the drawings have illustrated the ramp moved to the storage position by use of a hydraulic cylinder unit, it is contemplated that other operating mechanisms such as a mechanical counterbalancing system can be employed.

Various modes of carrying out the invention are contemplated as being within the scope of the following claims particularly pointing out and distinctly claiming the subject matter which is regarded as the invention.

I claim:

1. A vertically stored dockboard, comprising a frame to be secured to a loading dock, a ramp having an end hinged to the frame and having a generally vertical storage position and a generally horizontal operating position, operating means for moving the ramp from the horizontal to the storage position, and a locking mechanism for locking the ramp in the vertical storage position, said locking mechanism comprising a toggle assembly composed of a first toggle member pivotally connected to the undersurface of the ramp at a first pivot, a second toggle member pivotally connected to the frame at a second pivot, said first and second toggle members being connected together at a third pivot, said toggle assembly being constructed and arranged so that said third pivot is at an over-center position located in a direction toward the undersurface of the ramp from a line passing through the axes of said first and second pivots when said ramp is in the vertical storage position to thereby lock said ramp in said storage position.

2. The dockboard of claim 1, and including biasing means separate from said operating means for urging the third pivot to said over-center position.

3. The dockboard of claim 1, and including release means operably connected to said toggle assembly for manually moving said toggle assembly to an under-center condition wherein said third pivot is located in a direction away from said undersurface from said line.

4. The dockboard of claim 1, and including sensing means for sensing the over-center position of said toggle assembly and discontinuing operation of said operating means.

5. The dockboard of claim 4, wherein said operating means comprises a hydraulic cylinder unit.

6. The dockboard of claim 1, and including cushioning means connected to the toggle assembly for cushioning upward swinging movement of the ramp to the vertical storage position.

7. The dockboard of claim 6, and including second cushioning means connected to said toggle assembly for cushioning movement of said ramp in a direction towards said horizontal position when said toggle assembly is in the overcenter condition.

8. The dockboard of claim 3, wherein said release means comprises a release member operably connected to said toggle assembly and mounted for movement in a direction toward and away from the undersurface of said ramp, and an operating member for manually moving said release member in a direction away from the undersurface of said ramp to move said toggle assembly from the over-center to the under-center position.

9. A vertically stored dockboard, comprising a frame secured to a loading dock, a ramp having a rear end hinged to the frame and movable between a generally vertical storage position and a generally horizontal operating position, power operated means for moving the ramp between the operating position and the vertical storage position, and locking means for locking the ramp in the vertical storage position, said locking means consisting of a toggle assembly including a first toggle member pivotally connected to the underside of the ramp at a first pivot, a second toggle member pivotally connected to the frame at a second pivot, said first and second toggle members being pivotally connected together at the third pivot, said toggle assembly being constructed and arranged so that said assembly is in an under-center condition with said first and second toggle members being disposed at an acute angle with relation to each other when said ramp is in the operating position and said toggle assembly being constructed and arranged so that said toggle assembly is in an over-center position with said third pivot being located in a direction toward the undersurface of the ramp from a line passing through the axes of said first and second pivots when said ramp is in the vertical storage position, and release means operably connected to said toggle assembly for manually moving said toggle assembly from said over-center position to an under-center position to permit free descent of said ramp from said vertical storage position to said horizontal operating position.

* * * * *